United States Patent [19]

Heitz et al.

[11] Patent Number: 4,605,713

[45] Date of Patent: Aug. 12, 1986

[54] PROCESS FOR THE PRODUCTION OF POLYARYLENE SULPHIDES WITH FUNCTIONAL END GROUPS

[75] Inventors: Walter Heitz, Kirchhain; Wolfgang Koch, Mittenaar, both of Fed. Rep. of Germany

[73] Assignee: Bayer Aktiengesellschaft, Leverkusen, Fed. Rep. of Germany

[21] Appl. No.: 739,143

[22] Filed: May 30, 1985

[30] Foreign Application Priority Data

Jun. 9, 1984 [DE] Fed. Rep. of Germany ....... 3421610

[51] Int. Cl.$^4$ ............................................. C08F 283/00
[52] U.S. Cl. ...................................... 525/537; 528/388
[58] Field of Search .......................... 528/388; 525/537

[56] References Cited

U.S. PATENT DOCUMENTS 4,362,864 12/1982 Idel et al. .............................. 528/388
4,451,644 5/1984 Ostlinning et al. ................. 528/388

Primary Examiner—Melvyn I. Marquis
Attorney, Agent, or Firm—Connolly and Hutz

[57] ABSTRACT

This invention relates to a process for the production of polyarylene sulphides with functional end groups.

3 Claims, No Drawings

PROCESS FOR THE PRODUCTION OF POLYARYLENE SULPHIDES WITH FUNCTIONAL END GROUPS

This invention relates to a process for the production of polyarylene sulphides with functional end groups.

Polyarylene sulphides and the production thereof are known, for example, from U.S. Pat. Nos. 25,13,188, 31,17,620, DE-AS No. 24 53 485, DE-OS No. 26 34 462. It is also known that in the production of polyarylene sulphides, the process can be carried out in such a way that the polymers produced contain groups still capable of further reaction (e.g. FR-PS No. 2 470 780).

It was found, that polyarylene sulphides with reactive end groups capable of further reaction, are obtained when a disulphide-containing polyarylene sulphide is produced by addition of disulphides and optionally oxidation agents, which polyarylene sulphide is reacted with monofunctional compounds after reduction.

The object of the invention is thus a process for the production of polyarylene sulphides with functional end groups from (a) from 50 to 100 mol % of dihalogen aromatic substances of the formula

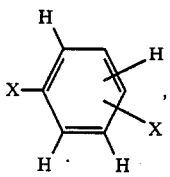

and from 0 to 50 mol % of dihalogen aromatic substances of the formula

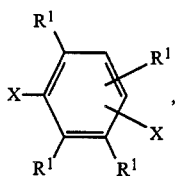

wherein,

X represents halogen such as chlorine or bromine in the meta or para position relative to each other, and $R^1$ is the same or different and can be hydrogen, $C_1$–$C_4$-alkyl, $C_5$–$C_{10}$-cycloalkyl, $C_6$–$C_{10}$-aryl, $C_7$–$C_{14}$-alkylaryl, $C_7$–$C_{14}$-arylalkyl, whereby two radicals $R^1$, in the ortho position relative to each other, can be bound to an aromatic or heterocyclic ring having up to 10 ring atoms, whereby up to 3 ring carbon atoms can be replaced by heteroatoms such as O, N, S, and one radical $R^1$ is always different from hydrogen, (b) alkali sulphides, preferably sodium sulphide or potassium sulphide or a mixture thereof, preferably in the form of the hydrates thereof or aqueous mixtures, optionally together with alkali hydroxides such as sodium hydroxide and potassium hydroxide, the molar ratio of a:b being in the range of from 1:1 to 1:3, preferably from 1:1 to 1:1.5 and (c) aromatic disulphides of the formula

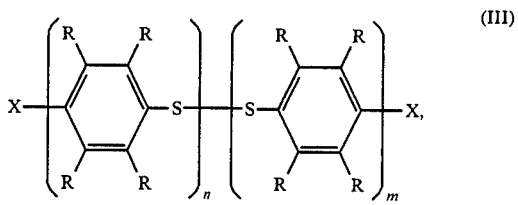

wherein,

X is halogen such as chlorine and bromine,

R is hydrogen, a $C_1$–$C_4$-alkyl radical, a $C_5$–$C_{10}$-cycloalkyl radical, a $C_7$–$C_{14}$-aryl radical and the total number of carbon atoms in each aromatic substance is from 6 to 30, with the proviso that R must be hydrogen in at least 50 mol % of the disulphide used, and n,m are integers of from 1 to 5, preferably of from 1 to 3, the molar ratio of the disulphide to the dihalogen benzene of the formulae (I) and (II) being in the range of from 0.01:1 to 1.0:1, as well as optionally oxidizing agents in (d) organic solvents, preferably N-alkyl lactams or peralkylated ureas, optionally with the coincidental use of catalysts and/or co-solvents, the molar ratio of alkali sulphides (b) to the organic solvent (d) being in the range of from 1:2 to 1:20, and (e) water in the form of water of hydration or free water, the molar ratio of b:e being in the range of from 1:0 to 1:9, preferably from 1:3 to 1:5 the process being carried out at a reaction temperature of from 140° C. to 280° C., optionally under excess-pressure, in which process the disulphide-containing polyarylene sulphide is reacted with reducing agents in the presence of a compound which is monofunctional under reaction conditions and optionally a base, with the proviso that the molar ratio of the reducing agent, as well as the compound which is monofunctional under reaction conditions, to the disulphide of the formula (III) or to the sum of disulphide and oxidizing equivalents of the oxidizing agent, is in a range of from 1:1 to 2:1.

Examples of dihalogen aromatic substances of formula (I) used according to the invention are: m-dichlorobenzene, p-dichlorobenzene, p-dibromobenzene, m-dibromobenzene and 1-chloro-4-bromobenzene. They are applicable alone or in admixture with each other.

Examples of dihalogen aromatic substances of formula (II) used according to the invention are: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2, 4,5-tetramethyl-2,6-dichlorobenzene, 1-cyclohexyl-2,5-di-chlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene, 1-hexyl-2,5-dichlorobenzene. They can be used alone or in admixture with each other.

With the addition of polyhalogen compounds, optionally from 1 to 50 mol %, preferably from 1 to 25 mol % of further bases, for example, alkali hydroxides such as NaOH or KOH or from 0.5 to 25 mol %, preferably from 0.5 to 12.5 mol % of carbonates such as $Na_2CO_3$, based on the alkali sulphide used, are added.

Examples of disulphides of formula (III) used according to the invention are: 4,4'-dibromodiphenyldisulphide, 4,4'-dichlorodiphenyldisulphide, bis(4-bromo-3-methylphenyl)-disulphide, bis-(4-(4-bromophenylthio)- phenyl)-disulphide. They can be used alone or in admixture.

Examples of oxidizing agents used according to the invention are: elementary sulphur, halogen such as iodine, bromine, chlorine, metallic salts such as manganese(IV)oxide, iron(III)chloride, copper (I;II)chloride.

The disulphide-containing polyarylene sulphide can be reacted directly in situ or after isolating with the reducing agent and the monofunctional compound.

In the latter case, the reaction is carried out in an organic solvent, the weight ratio of the disulphide-containing polyarylene sulphide to the organic solvent (d) being in the range of from 1:2 to 1:20.

Examples of reducing agents used according to the invention are: complex hydrides such as sodium borohydride, lithium aluminium hydride, phosphorus compounds such as triphenylphosphine, sulphur compounds such as sodium sulphite, metals such as zinc, magnesium, iron, organic compounds such as sugar. They can be used alone or in admixture with each other.

An addition of equimolar quantities of water and optionally inert gas atmosphere (e.g. $N_2$) can favourably influence the effect of the reducing agents.

To the reaction mixture under reaction conditions are added monofunctional compounds of the formula (IV)

$$X-R^1-Y \qquad (IV),$$

wherein,

X represents chlorine, bromine or a vinyl group,

Y represents hydrogen, $-O-CH=CH_2$, $-S-CH=CH_2$, $-OH$, $-OR^2$, $-SR^2$, $-NR^2$, $-NO_2$, $-CN$, $-COOR^2$, $-CHO$, $R^1$ represents an alkyl radical or a cycloalkyl radical having from 1 to 10 carbon atoms, an aryl radical having from 6 to 10 carbon atoms, with the proviso that two substitutents Y can then be positioned on the aryl radical, or an aryl radical of the formula (V)

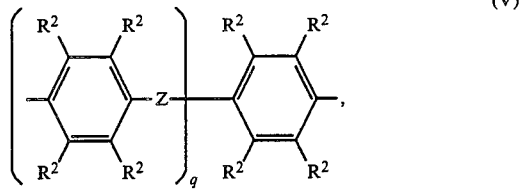

wherein,

Z is $CH_2$, $C(CH_3)_2$, sulphur or oxygen and each $R^2$ is hydrogen, an alkyl radical, a cycloalkyl radical, an aryl radical or a mixture thereof and represents the number 0 or 1.

The following compounds of the formula (IV) can, for example, be used.

1-bromodecane, isopropylbromide, tert.-butylbromide, 2-chloroethyl-vinylether, 2-bromoethanol, 2-bromoethylethyl-ether, chlorodimethylsulphide, 2-bromoethylamine, 2-diethyl-amino-ethylchloride, 2-bromonitroethane, 2-chloroacetic acid, 4-chlorophenylvinylsulphide, 4-bromophenol, 2,6-dimethyl-4-bromophenol, 4-bromoanisol, 4-bromoaniline, 3-bromonitrobenzene, 4-chlorobenzonitrile, 4-chlorobenzaldehyde, 4-chlorobenzoic acid, 4-chlorophthalic acid, 4-chlorophthalic acid anhydride, 4-chloro-o-phenylene diamine, 4-bromo-tert.-butyl-benzene, 4-chloro-4'-hydroxybenzophenone, 4-bromo-4'-hydroxybiphenyl, 4-bromo-4'-aminodiphenylsulphide, 4-bromo-4-hydroxydiphenylether, (4-bromophenyl)-4'-hydroxyphenyl)-methane.

The alkali sulphides, preferably potassium sulphide and sodium sulphide, are preferably used in the form of their hydrates or aqueous solutions. They can also be directly produced from hydrogen sulphide and the corresponding alkali hydroxides or from alkali hydrogen sulphides and the corresponding alkali hydroxides according to a stoichiometric reaction in the reaction solution. Mixtures of the alkali sulphides can be used.

Depending on the proportion of alkali hydrogen sulphide in the reaction solution, which can be contained as impurity in the alkali sulphide or may be formed during the reaction, stoichiometric alkali hydroxide such as sodium hydroxide or potassium hydroxide is additionally metered in, in order to regenerate the alkali sulphide. In place of the alkali hydroxides, compounds can optionally be added, which split off or form alkali hydroxides under reaction conditions.

If sulphur is used as oxidizing agent, sulphur: dihalogen benzene in a range of from 0.02:1 to 0.3:1 is preferably used.

The disulphide of the formula (III) as well as the oxidizing agent can be added to the reaction mixture at the beginning of the reaction, for the production of disulphide-containing polyarylene sulphide, or up to a point in time corresponding to 90% of the total duration of the first reaction stage.

The reducing agent and the monofunctional compound of the formula (IV) can be added together to the reaction mixture at the beginning of the reaction of the disulphide-containing polyarylene sulphide. The addition of the compound of the formula (IV) can, however, also still take place up to a point in time corresponding to 50% of the total duration of the second reaction stage.

Any polar solvent can generally be used for the reaction, which guarantees sufficient solubility of the organic and inorganic reactants under reaction conditions. Amides, lactams and ureas are preferably used and N-alkylated amides, lactams and cyclio ureas are particularly preferably used.

Lactams in the context of the invention are such as those of amino acids having from 3 to 5 carbon atoms, which can optionally carry substitutents on the carbon skeleton, which are inert under reaction conditions, for example, alkyl radicals having from 1 to 5 carbon atoms.

N-alkyl lactams in the context of the invention are defined as the lactams according to the invention, but carry, in addition on the nitrogen atoms, an alkyl radical having from 1 to 6 carbon atoms.

Ureas in the context of the invention are tetraalkylated ureas of the formula (VI)

wherein, $R^2$ can be the same or different and represents a $C_1$- to $C_4$-alkyl radical, as well as cyclic ureas of the formula (VII),

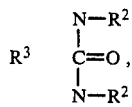

wherein,

R² is as defined above and preferably represents methyl and

R³ represents an ethylene radical or propylene radical, which can also be substituted.

The following are given as examples: N,N-dimethylformamide, N,N-diethylacetamide, N,N-dipropylacetamide, N,N-dimethylbenzoic acid amide, caprolactam, N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-isobutyl-2-piperidone, N-methyl-6-methyl-2-piperidone, N-methyl-3-ethyl-2-piperidone, N-methyl-2-oxo-hexamethylene imine, N-ethyl-2-oxo-hexa-methylene imine, tetramethyl urea, 1,3-dimethylethylene urea, 1,3-dimethyl-propylene urea.

Mixtures of the aforementioned solvents can be selected. The quantity of solvent can be varied in a wide range, from 2 to 20 mol per mol of alkali sulphide is generally present in the first reaction stage and from 2 to 20 mol per 100 g of disulphide-containing polyarylene sulphide in the second reaction stage.

The reaction temperature in both reaction stages is generally from 140° to 280° C., preferably from 180° to 240° C.

The production of polyarylene sulphide with functional end groups can also be carried out in two temperature ranges. It is thus possible, for example, that after addition of the disulphide of the formula (III) or of the oxidizing agent, a temperature of from 140° to 260° C. is selected and after addition of the reducing agent and of the monofunctional compound of the formula (IV) a temperature range is selected, which is from 20° to 50° C. above the first temperature range.

The pressure during the reaction can be from 1 to 20 bars during both reaction stages.

The reaction time can be up to 10 h in both reaction stages, preferably from 0.2 to 8 h. A stepwise increase in the reaction temperature during the reaction can be advantageous.

The dihalogen benzene and the alkali sulphide are reacted in approximately equimolar quantities. The molar ratio dihalogen benzene/alkali sulphide is in the range of from 1:1 to 1:3, preferably from 1:1 to 1:1.5.

The process according to the invention can be carried out as follows: The alkali sulphides are placed in the solvent and then the water content can be reduced optionally in one or more stages, for example, by distilling off the water from the solution. A partial dehydration before addition of the dihalogen compounds can be advantageous.

In principle, the mixing together of the reaction components during the first reaction stage can take place in any manner. The dihalogen aromatic substances of the formulae (I) and (II), the disulphide of the formula (III) as well as optionally the oxidizing agent can be added together or separately, continuously, in portions or directly all at once to the alkali sulphide and the solvent or a part thereof. The alkali sulphide can also be added together with the solvent or a part thereof to the compounds of the formulae (I) and (II) and the disulphide of the formula (III). All reactants can also be directly mixed together. Any other combinations of the addition of the reactants are likewise possible.

The addition of the reducing agent and the compound, which is monofunctional under reaction conditions, of the formula (IV) can likewise take place together or separately, in any sequence, all at once, portionwise or continuously, optionally dissolved in the solvent used for the reaction.

If after the first reaction stage separation of the disulphide-containing polyarylene sulphides takes place, an analogous procedure is followed, with the proviso, that an organic solvent is additionally added to the reaction mixture.

The separation of the disulphide-containing polyarylene sulphide as well as of the polyarylene sulphide with reactive end groups takes place in a conventional manner.

The polyarylene sulphide can be separated directly from the reaction solution or after addition, for example, of water and/or diluted acids, by conventional methods of filtration or of centrifuging. The separated polyarylene sulphides are then washed, for example with water.

A wash or extraction with other washing fluids, which can also be carried out in addition to or subsequent to this wash, is also possible.

Furthermore, the polymer can be recovered by removing the solvent from the reaction chamber and by a subsequent wash, as described above.

The polyarylene sulphides according to the invention can be further reacted via their reaction end groups to produce linear or cross-linking polymers and can be coincidentally used, for example, for building up other plastics.

EXAMPLE 1

Production of poly(thio-1,4-phenylene) with carboxylic acid end groups.

3.63 g (27.5 mmol) of sodium sulphide trihydrate, 3.23 g (22 mmol) of p-dichlorobenzene, 1.579 g (5.5 mmol) of 4,4'-dichlorodiphenyldisulphide and 30 ml of N-methyl-2-pyrrolidone are mixed together in a 50 ml glass autoclave equipped with a stirrer, a manometer and a metering device. The reaction mixture is rinsed with nitrogen and heated for 2 h to 240° C., a maximum pressure of 7.2 bars being present. After cooling the mixture to room temperature, a light yellow solid material is obtained by precipitating in 20% sulphuric acid, which solid material is firstly washed with water and then extracted with methanol, in order to remove low molecular weight constitutents.

After drying in a vacuum (15 torr) at 60° C., 2.84 g (75.8%) of the disulphide-containing poly(thio-1,4-phenylene) are obtained.

0.5 g of the produced disulphide-containing poly(thio-1,4-phenylene), 0.26 g (1.0 mmol) of triphenylphosphine, 20 mg of water, 0.23 g of N,N-dimethylaminopyridine as a base, 0.31 g (2 mmol) of p-chlorobenzoic acid and 20 ml of N-methyl-2-pyrrolidone are mixed together in the aforementioned apparatus. After rinsing with nitrogen, the reaction mixture is heated for 2 h to 240° C., the pressure rising to 2.3 bars. After cooling to room temperature, a white solid material can be obtained by precipitation in methanol.

Drying in a vacuum (15 torr) at 60° C. results in 0.48 g of the polymer with carboxylic acid end groups.

Infrared absorption band (cm$^{-1}$);
1,685 (C=O Stretching vibration).
1,280-1,295 (C—OH Stretching vibration).
molecular weight ($M_n$): 1,150.

EXAMPLE 2

Production of poly(thio-1,4-phenylene) with phthalic acid end groups 3.68 g (25 mmol) of p-dichlorobenzene, 3.30 g (25 mmol) of sodium sulphidetrihydrate, 80.2 mg (2.5 mmol) of sulphur and 30 ml of N-methyl-2-pyrrolidone are mixed together in the apparatus described in Example 1 and heated for 4 h to 220° C. The temperature is then reduced to 180° C. and the apparatus is opened. After addition of 163 mg (2.5 mmol) of zinc powder and 1.00 g (5.0 mmol) of 4-chlorophthalic acid, heating is again carried out for 2 h to 260° C. The cooled reaction mixture is poured into 200 mol of ln-hydrochloric acid, drawn off by suction and washed with methanol.

After drying, 2.92 g (82.7%) of phthalic acid-containing poly(thio-1,4-phenylene) are obtained. The melting point is 272° C.

EXAMPLE 3

Production of poly(thio-1,4-phenylene) with nitrile end groups 5.90 g (25 mmol) of p-dibromobenzene, 109 mg (1.25 mmol) of manganese dioxide, 3.47 g (26.25 mmol) of sodium sulphide trihydrate and 30 ml of N-methyl-2-pyrrolidone are mixed together in the described apparatus and heated for 2 h to 200° C. 344 mg (2.5 mmol) of 4-chlorobenzonitrile and 328 mg (1.25 mmol) of triphenylphosphine, dissolved in 5 ml of N-methyl-2-pyrrolidone are then pumped in and the reaction mixture is heated for a further 2 h to 240° C. During the reaction the maximum pressure is 5.1 bars. After cooling, the reaction mixture is worked-up as described in Example 2.

After drying in a vacuum (15 torr) at 60° C., 2.78 g (91.9%) of the polymer with nitrile end groups are obtained. The melting point of the light yellow solid material is 288° C.

We claim:

1. Process for the production of polyarylene sulphides with functional end groups wherein
(a) from 50 to 100 mol % of dihalogen aromatic substances correspond to the formula (I)

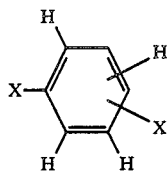

(I)

and from 0 to 50 mol % of dihalogen aromatic substances corresponding to the formula (II)

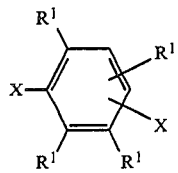

(II)

in which
X represents halogen in the meta or para position relative to each other,
$R^1$ is the same or different and each represents hydrogen, $C_1$-$C_4$-alkyl, $C_5$-$C_{10}$-cycloalkyl, $C_6$-$C_{10}$-aryl, $C_7$-$C_{14}$-alkylaryl $C_7$-$C_{14}$-arylalkyl, wherein two radicals $R^1$ in the ortho position relative to each other are bound to an aromatic or heterocyclic ring containing up to 10 ring atoms, wherein up to 3 ring carbon atoms are replaced by hetero atoms and one radical —$R^1$ is always different from hydrogen,
is reacted at 140° to 280° C. with
(b) alkali metal sulphide, the molar ratio of a:b lying in the range of from 1:1 to 1:3,
(c) organic solvent, the molar ratio of alkali sulphide (b) to the organic solvent (c) lying in the range of from 1:2 to 1:20,
(d) water in the form of water of hydration or free water, the molar ratio of b:d lying in the range of from 1:0 to 1:9, and
(e) a dihalogenated aromatic disulphide corresponding to formula (III)

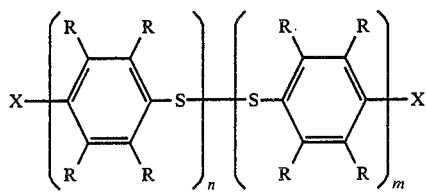

(III)

in which
X represents halogen,
R represents hydrogen, a $C_1$-$C_4$-alkyl radical, a $C_5$-$C_{10}$-cycloalkyl radical, a $C_7$-$C_{14}$-aryl radical and the total number of carbon atoms in each aromatic substance is from 6 to 30, with the proviso that —R is hydrogen in at least 50 mol % of the disulphide used,
n and m are integers of from 1 to 5,
wherein the molar ratio of the disulphide to the p-dihalogen benzene corresponding to formulae (i) and (II) is in the range of 0.01:1 to 1.0:1,
whereby an intermediate polymer is produced and then reacting the intermediate polymer with a reducing agent in the presence of
(f) a compound which is monofunctional under the reaction conditions and which comprises a compound corresponding to the formula (IV)

D-Q-Y$_t$ (IV)

wherein
D represents chlorine, bromine or a vinyl group

Y represents hydrogen, —O—CH=CH$_2$, —S—CH=CH$_2$, —OH, —OR$^2$, —SR$^2$, —NR$^2$, —NO$_2$, —CN, —COOR$^2$, or CHO, Q represents an alkylene radical or a cycloalkylene radical containing from 1 to 10 carbon atoms, an arylene radical containing from 6 to 10 carbon atoms, or an arylene radical corresponding to formula (V)

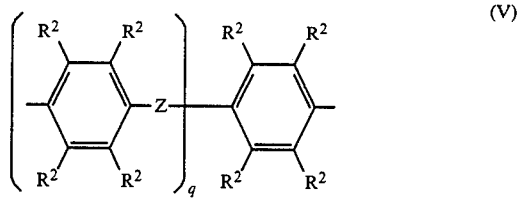

t is 1 or 2 when Q is arylene containing 6 to 10 carbon atoms and is otherwise 1, Z represents CH$_2$, C(CH$_3$)$_2$, sulphur or oxygen, r$^2$ represents hydrogen, an alkyl radical, a cycloalkyl radical, an aryl radical or a mixture thereof, and p1 q represents the number 0 to 1.

2. Process according to claim 1 wherein the reducing agent is in an amount in excess of the aromatic disulphide of formula (III).

3. Process according to claim 1 wherein the reducing agent is sodium borohydride, lithium aluminum hydride, triphenylphosphine, sodium sulphite, zinc, magnesium, iron, sugar or mixtures thereof.

* * * * *